Sept. 15, 1931.  L. B. BEECHER ET AL  1,823,524
SPIRIT LEVEL
Filed March 16, 1926
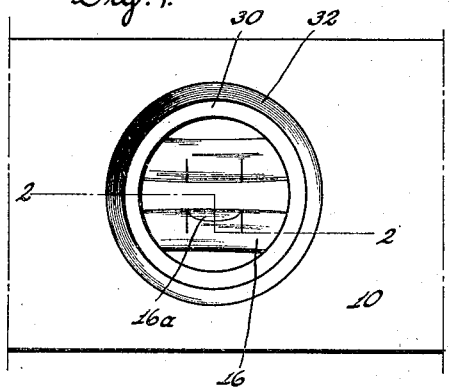
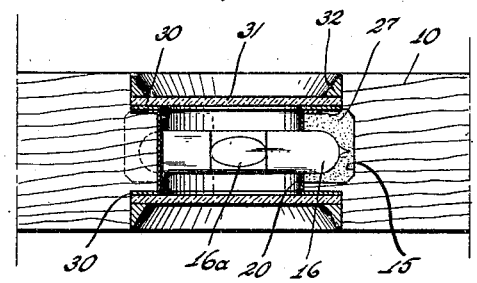
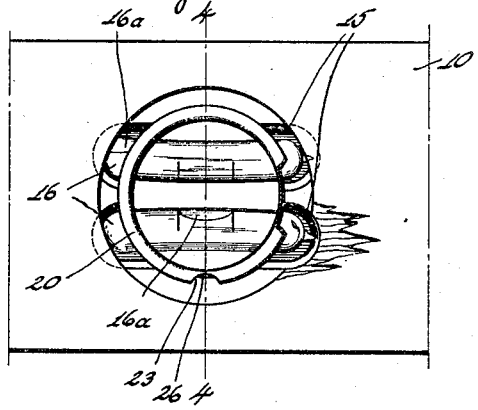
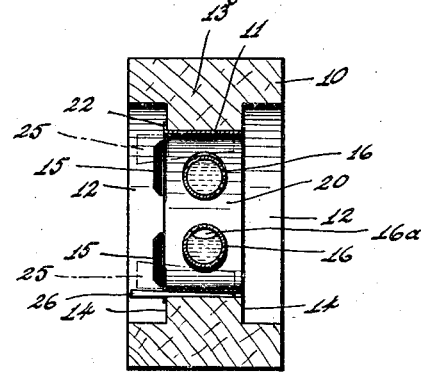
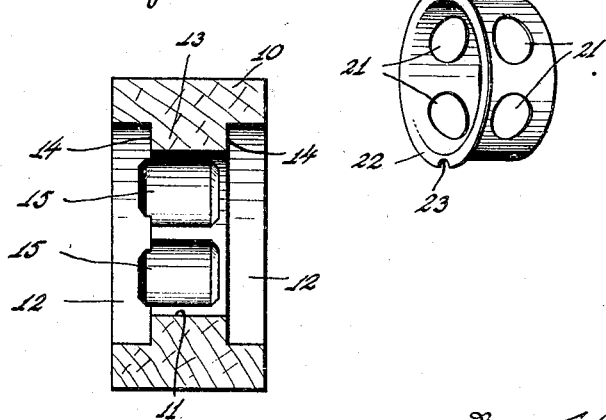
Inventor
Lewis B. Beecher
Patrick Ahern
By T. Clay Lindsey
Their Attorney Patented Sept. 15, 1931

1,823,524

UNITED STATES PATENT OFFICE

LEWIS B. BEECHER, OF KENSINGTON, AND PATRICK AHERN, OF NEW BRITAIN, CONNECTICUT, ASSIGNORS TO THE STANLEY WORKS, OF NEW BRITAIN, CONNECTICUT, A CORPORATION OF CONNECTICUT

SPIRIT LEVEL

Application filed March 16, 1926. Serial No. 95,129.

This invention relates to spirit levels of the sort having one or more spirit tubes held in place in the level stock by a cementitious material. Heretofore, it has been the practice, in levels of this sort, to provide the level stock with an opening with recesses at opposite sides in which the ends of the spirit tube were cemented. The disadvantages to this old practice were that a very heavy or thick cement or plaster was necessary for holding the ends of the tube in place and, although the greatest care was taken, the cement would run out of the recesses and mar and disfigure the walls of the opening which the tube bridged, making it necessary to go to considerable time and expense in scraping and making the wall neat and presentable.

The aim of the present invention is to provide a novel, simple and effective mounting for a spirit tube or tubes wherein the disadvantages incident to mountings as heretofore made are entirely eliminated. By proceeding in accordance with the present invention, the spirit tubes may be very easily and properly adjusted preliminary to being cemented in place; a cementitious material of the proper constituency may be employed for holding the tubes in adjusted position; the walls of the opening in which the tube is mounted are in no way disfigured by the cementitious material; and all necessity of cleaning the cement either from the tubes or the walls of the opening in which they are mounted is entirely eliminated. Our improved arrangement is very simple in construction, the parts may be quickly assembled, and, when assembled, are securely held in place, and the assembled structure presents a pleasing and neat appearance.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings forming a part of this specification, and wherein we have shown, for illustrative purposes one of the embodiments which the present invention may take:

Figure 1 is a side elevational view of the assembled structure;

Fig. 2 is a sectional view taken on line 2—2 of Fig. 1;

Fig. 3 is a side elevation showing the spirit tubes and our improved ferrule in place in the stock, the cement not yet being applied;

Fig. 4 is a vertical sectional view taken on line 4—4 of Fig. 3;

Fig. 5 is a view similar to Fig. 4 with the tubes and ferrule omitted;

Fig. 6 is a perspective view of the ferrule having apertures for accommodating two spirit tubes; and Fig. 7 is a view similar to Fig. 6, but illustrating the ferrule having but a single pair of apertures.

Referring to the drawings in detail, 10 designates a level stock of any desired construction, shape and material, only a portion of the stock here being illustrated as the particular construction thereof forms no part of the present invention. The stock is provided with an opening 11, the form and shape of which may be varied, it here being shown for illustrative purposes as constituting a cylindrical bore. To each end of the opening 11 may be an enlarged counterbore 12 so that the stock has a through hole, so to speak, provided between its ends with an internal circumferential rib 13 having side faces or ledges 14. The rib is provided with one or more pairs of transversely alined channels or recesses 15 which preferably do not extend throughout the width of the rib but do extend radially beyond the peripheries of the enlarged bores 12. In Figs. 2 to 5, the opening is shown as having two such pairs of recesses so as to accommodate two spirit tubes 16, but, obviously, this is by way of illustration only and, in case a single tube is to be mounted in the opening, in which instance the ferrule shown in Fig. 7 would be employed, only one pair of such recesses would be provided.

In accordance with the present invention, we provide a ferrule 20 conforming to the shape of the opening 11 and adapted to form a lining or sleeve therein. This ferrule, by preference, has a length co-extensive to the width of the rib 13 and may have at one end a circumferential flange 22 adapted to overlie one edge of the opening 11, as shown most clearly in Figs. 2 and 4. The walls of the ferrule are provided with one or more pairs of alined apertures 21 through which the tubes are adapted to extend. In case two tubes are employed, the ferrule will have two pairs of such apertures, as shown in Fig. 6, and in case a single tube is used, the ferrule will have but a single pair of apertures, as shown in Fig. 7. The tubes have a more or less close fit in the apertures 21 so that, when the cementitious material is poured into the recesses 15, this material will not flow onto the exposed portions of the tubes or the interior periphery of the ferrule.

The parts may be very quickly adjusted and assembled in the following manner: The tubes 16 are positioned in the apertures 21 of the ferrule or sleeve 20 and may be held against endwise movement therein by wedges 25. The ferrule is then placed, as shown in Fig. 4, in the opening 11 with the ends of the tubes extending into the recesses 15, as shown in Fig. 3. The ferrule, together with the tubes carried thereby, may be rotatably adjusted so that the bubble 16—a of the spirit tube 16 will register centrally between the two indicating marks of the spirit tube when the base of the level stock is in a level or horizontal position, as shown in Fig. 3. The ferrule may be held in this adjusted position in any suitable manner as, for example, by means of a wedge 26 and, if desired, the flange 22 may be notched, as at 23, to accommodate this wedge. It is obvious that the ferrule may be otherwise held in adjusted position. The cementitious material 27 is then put into the recesses 15 and allowed to dry. Then, if desired, the ring washers 30 and the glass disks 31 may be positioned in the counterbores and held in place by putty or cement 32 as is usual in structures of this sort.

It will be seen from the foregoing description, taken in connection with the accompanying drawings, that the parts, each of which is of simple construction, may be very readily assembled and securely held in place in proper adjusted position. The ferrule, which may be given a polished or enameled finish, gives to the opening a pleasing and neat appearance and, since the cement cannot run between the tubes and the edges of the apertures 21 and onto the exposed portions of the tubes and the internal circumference of the ferrule, the expense heretofore necessary in cleaning up exposed surfaces, after the cement has hardened, is entirely eliminated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A level stock having a transverse opening provided with a counter-bore at one end and provided with recesses in its wall, said recesses opening into the peripheral surface of said transverse opening and also into said counterbore, a member having a ferrule fitting in said opening and having apertures adapted to register with the ends of said recesses, a spirit tube having its ends extending through said apertures and into said recesses, and a cementitious material within said recesses in which the ends of said tube are embedded for holding said tube in fixed position.

2. A level stock having a transverse opening, a centrally located circumferential rib in said opening and having opposed recesses each opening into one side face and the peripheral face of said rib, a member provided with a ferrule fitting within said rib and having apertures registering with said recesses, said recesses where they open into said side face being extended beyond the periphery of said member to permit the insertion of a cementitious material in said recesses, a tube extending through said apertures and having its ends extending into said recesses, said ferrule closing said recesses about said tube, and a cementitious material in the pockets formed by said recesses and ferrule and in which the ends of said tube are embedded, whereby said tube is held in fixed relation to said stock.

3. A level stock having a transverse opening provided with a circumferential rib between its ends, said rib being provided with recesses opening into the peripheral face and one side face of said rib, a ferrule fitting in said opening and having a flange at one end adapted to engage that side face of said rib into which said recesses open, said recesses where they open into said side face being extended beyond the periphery of said flange, said ferrule having apertures registering with said recesses, a spirit tube having its ends extending through said apertures and into said recesses, a cementitious material filling said recesses and in which the ends of said tube are embedded, a glass disk engaging against said flange, and means for holding said glass disk in place.

4. A level stock having a transverse sight opening and a pair of opposed recesses in the peripheral wall of said opening, a lining for the opening having apertures in registry with said recesses, a spirit tube in said sight opening having its extremities extending through the lining apertures and extending into the recesses, and a cementitious material in said recesses and in which the ends of said tube are embedded whereby the tube is fixedly anchored in the stock solely by said cementitious material and independently of said lining, said lining constituting means for confining the cementitious material within said recesses and imparting a pleasing appearance to the peripheral wall of the sight opening.

LEWIS B. BEECHER.
PATRICK AHERN.